United States Patent
Markman et al.

(10) Patent No.: US 7,038,730 B2
(45) Date of Patent: May 2, 2006

(54) MATCHED PULSE SHAPING FILTER

(75) Inventors: Ivonete Markman, Carmel, IN (US); Gabriel Alfred Edde, Indianapolis, IN (US)

(73) Assignee: Thomson Licensing, Boulogne-Billiancourt (FR)

( * ) Notice: Subject to any disclaimer, the term of this patent is extended or adjusted under 35 U.S.C. 154(b) by 701 days.

(21) Appl. No.: 10/192,039

(22) Filed: Jul. 10, 2002

(65) Prior Publication Data

US 2004/0008286 A1    Jan. 15, 2004

(51) Int. Cl.
*H04N 5/21*    (2006.01)
*H04N 5/213*   (2006.01)
*H04N 5/217*   (2006.01)

(52) U.S. Cl. .............. 348/607; 348/725; 348/726; 348/731; 375/232; 375/326

(58) Field of Classification Search .............. 348/607, 348/725–726, 731; 375/321, 350, 232, 326, 375/346, 365; H04N 5/21, 5/213, 5/217
See application file for complete search history.

(56) References Cited

U.S. PATENT DOCUMENTS

| 5,309,482 | A | * | 5/1994 | Wright et al. ............ 375/350 |
| 5,648,923 | A | * | 7/1997 | Lane et al. ............... 708/319 |
| 5,661,528 | A | * | 8/1997 | Han ........................ 348/607 |
| 5,818,544 | A | | 10/1998 | Han ....................... 348/725 |
| 5,955,618 | A | | 9/1999 | Kim ........................ 548/471 |
| 6,005,640 | A | * | 12/1999 | Strolle et al. ............ 348/726 |
| 6,219,379 | B1 | | 4/2001 | Ghosh ..................... 375/232 |
| 6,665,355 | B1 | * | 12/2003 | Chen et al. ............... 375/321 |
| 2001/0022813 | A1 | | 9/2001 | Tan et al. | |
| 2002/0039151 | A1 | | 4/2002 | Liu et al. | |

FOREIGN PATENT DOCUMENTS

EP    03 29 1571    10/2003

* cited by examiner

*Primary Examiner*—John Miller
*Assistant Examiner*—Trang U. Tran
(74) *Attorney, Agent, or Firm*—Joseph S. Tripoli; Ronald H. Kurdyla; Joseph J. Opalach

(57) ABSTRACT

A communications receiver receives a signal which has not been filtered by a matched pulse shaping filter. In the receiver, a circuit element processes the received signal and as a part of that process introduces additional linear distortion into the processed received signal. A matched filter, coupled to the circuit element, generates a fully matched filtered signal compensated for the distortion intrinsic to the received signal pulse shape and the distortion introduced by the circuit element.

6 Claims, 2 Drawing Sheets

MATCHED PULSE SHAPING FILTER

FIELD OF THE INVENTION

The present application relates to matched pulse shaping filters in a digital communications receiver and in particular to a matched pulse shaping filter in a high definition television receiver.

BACKGROUND OF THE INVENTION

In the field of digital communications, data bits are grouped to form digital symbols. Each symbol is then represented by a corresponding pulse shape, and a sequence of such pulses is used to modulate a carrier according to a chosen modulation format. One such digital communications system is the current high definition television (HDTV) broadcast standard adopted in the United States by the Advanced Television Systems Committee (ATSC) and described in the "ATSC Digital Television Standard", Document A/53 published on Sep. 16, 1995. In the ATSC-HDTV standard, each symbol represents 3 or 4 data bits, resulting in signal constellations of 8 or 16 symbols, respectively. In addition, each symbol is represented by a pulse with a square-root raised cosine shape and 11.5% roll-off. The adopted modulation format is suppressed carrier vestigial sideband modulation with 8 or 16 levels of amplitude (8-VSB or 16-VSB), that is, 8 or 16 possible symbols, respectively. In addition, a small in-phase pilot at the suppressed carrier frequency is added to the signal, being 11.3 dB below the average signal power.

An important property associated with the choice of the symbol representative pulse shape is to minimize intersymbol interference (ISI). ISI happens when the pulse representing one symbol interferes with the pulses representing temporally surrounding symbols, impairing the recovery of the transmitted symbol sequence. In particular, pulses described as Nyquist pulses have zero crossings at non-zero multiples of the symbol period, $T_S$, not interfering with adjacent symbols and being therefore ISI free. One Nyquist pulse of practical interest is the raised cosine pulse due to its smooth spectrum and easy filter implementation. The most popular pulse shape used in practical communications systems is the square-root raised cosine pulse, which is formed by taking the square root of the spectrum of a raised cosine pulse. This pulse shaping filter is used in both the transmitter and the receiver in order to split the spectral characteristics of the raised cosine pulse equally between the transmitter and the receiver. By cascading two square-root raised cosine filters together (one filter in the transmitter and the other in the receiver), the square-root raised cosine pulse spectrum is squared, thus creating a net system response of the desired raised cosine pulse, which is ISI free. In addition, because these filters are even around the center coefficient (tap), cascading both filters is equivalent to performing a matched filtering operation, which maximizes the signal-to-noise ratio (SNR) at the output of the receiver matched filter, that is, the receiver square-root raised cosine filter.

The ATSC HDTV standard suggests an arrangement for an HDTV receiver. In the suggested arrangement, the IF stage generates a near-baseband VSB signal with a pulse shape exhibiting the square-root raised cosine filter characteristic described above. A demodulator follows the IF stage and includes the following main functions: an analog to digital converter (ADC) which samples the near-baseband signal; a carrier tracking loop (CTL) which downconverts the sampled signal to baseband and corrects for any frequency offsets between the transmitter carrier and the receiver tuner local oscillator (LO); a symbol tracking loop (STL) which detects the symbol timing and provides sample rate conversion to the symbol rate; a synchronization detector which detects frames and segments within the received signal; and an equalizer which compensates for linear distortion introduced into the received signal by the communications channel or additional filtering.

It is desirable to implement the matched pulse shaping filter somewhere in the demodulator. Several locations have been proposed. Each location has advantages and disadvantages. First, the matched filter may be implemented as an analog filter and located before the ADC, or as a digital filter after the ADC However, if the filter is placed in either of these two locations, its input signal is subject to a carrier frequency offset between the transmitter carrier and the receiver tuner LO prior to correction by the CTL. Particularly, in the ATSC-HDTV standard, because the roll-off factor is so small (11.5%), the pulse excess bandwidth on each side of the spectrum (~310 KHz) is in the order of magnitude of a possible frequency offset (50 to 100 KHz). Therefore, such an offset can introduce unrecoverable distortion into the received signal, unless carrier offset information is fed back to the tuner for prior correction.

Second, the matched filter may be implemented as a baseband digital filter and located after the CTL. However, the CTL operation of down-conversion of the square-root raised cosine input signal to baseband introduces linear distortion in the signal, such that another square-root raised cosine filter is no longer the ideal matched filter. Third, the matched filter may be located after the STL. If placed in this location, the performance of the STL may be adversely affected by the ISI in the signal, and this is even more pronounced if the STL is decision directed. Fourth, the matched filter may be bypassed and its function performed by the equalizer. Ideally, the equalizer should use its taps to compensate for multipath and other unpredictable linear distortions. Using the equalizer to also implement the matched filter puts an additional burden on the equalizer. This burden may render the equalizer unable to compensate for multipath and other linear distortions for which it otherwise could compensate.

It is desirable to place the matched pulse shaping filter in the most advantageous location in the demodulator, and to modify its filter characteristics in order to provide optimum performance. In the following, it is assumed that the equalizer corrects for (unknown) linear distortions introduced by the communications channel (e.g., multipath propagation) and the function of the matched pulse shaping filter is to correct for (known) linear distortions associated with the pulse shape.

BRIEF SUMMARY OF THE INVENTION

In accordance with principles of the present invention a communications receiver receives a signal which has not been filtered by a matched pulse shaping filter. In the receiver, a circuit element processes the received signal and as a part of that process introduces additional linear distortion into the processed received signal. A matched filter, coupled to the circuit element, generates a fully matched filtered signal compensated for the distortion intrinsic to the received signal pulse shape and the distortion introduced by the circuit element.

DETAILED DESCRIPTION OF THE INVENTION

Figure 1:
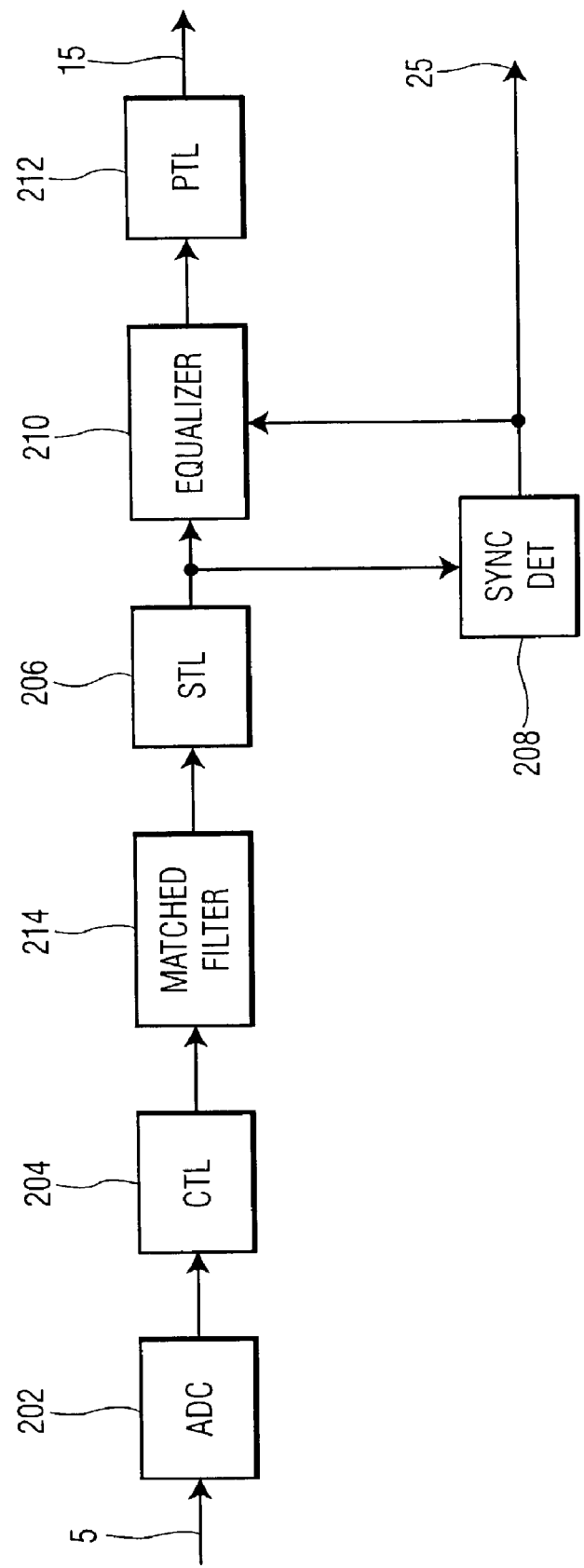
FIG. 1 is a block diagram of a portion of an HDTV receiver according to principles of the present invention.

FIG. 1 is a block diagram of a portion of an HDTV receiver according to principles of the present invention. In FIG. 1, an input terminal 5 is coupled to an output terminal of a receiver front end (not shown). The receiver front end comprises a source of an RF modulated HDTV signal, such as an antenna; an RF amplifier stage; an RF detector; and an IF amplifier stage. The receiver front end provides a near-baseband VSB signal which, as described above, includes successive symbol representative pulses having shapes exhibiting a square-root raised cosine filtered characteristic. The signal from the receiver front end also includes a pilot tone at a predetermined frequency, all in a known manner.

The input terminal 5 is coupled to a cascaded connection of an analog-to-digital converter (ADC) 202, a carrier tracking loop (CTL) 204, a matched pulse shaping filter 214, a symbol timing loop (STL) 206, an equalizer 210, and a phase tracking loop (PTL) 212. An output terminal of the STL 206 is further coupled to an input terminal of a synchronization detector 208. An output terminal of the synchronization detector 208 is coupled to a clock input terminal of the equalizer 210 and to other circuit elements (not shown) in the HDTV system via an output terminal 25.

An output terminal of the PTL 212 is coupled to an output terminal 15. The output terminal 15 is coupled to a receiver backend (not shown). The receiver backend comprises a trellis decoder, a data de-interleaver, a Reed-Solomon decoder, a descrambler and circuitry for generating the image represented by the video component and the sound represented by the audio component of the HDTV signal, all in a known manner.

Figure 2A:
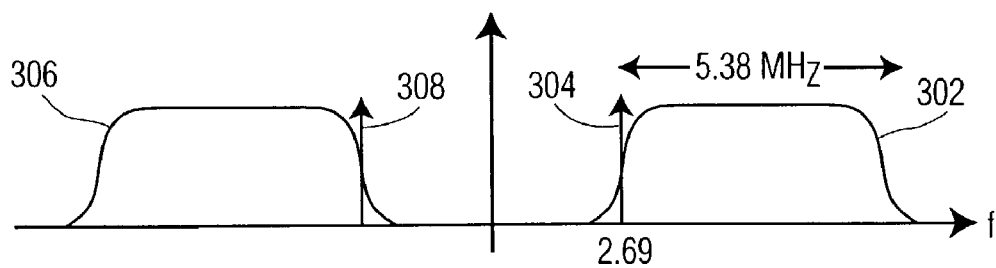
FIGS. 2a through d are spectral diagrams useful in understanding the operation of the portion of the receiver illustrated in FIG. 1.

FIG. 2a through d are spectral diagrams useful in understanding the operation of the portion of the receiver illustrated in FIG. 1. In operation, the ADC 202 converts the analog IF output signal to a stream of multibit digital samples representing the near baseband signal from the receiver front end. In the illustrated embodiment, the ADC operates at a sampling rate of 27 MHz. FIG. 2a illustrates the two-sided spectrum representing the near baseband signal from the ADC 202. The spectrum in FIG. 2a includes the spectral component 302 of the symbol representative signal (and the negative image 306). As described above, this spectral component has a square-root raised cosine shape, of known mathematical description, and a bandwidth of around 5.38 MHz. In addition, a pilot tone 304 (and the negative image 308) is also included in the IF output signal. In the illustrated embodiment, the pilot tone is located at, or near, 2.69 MHz.

Figure 2B:
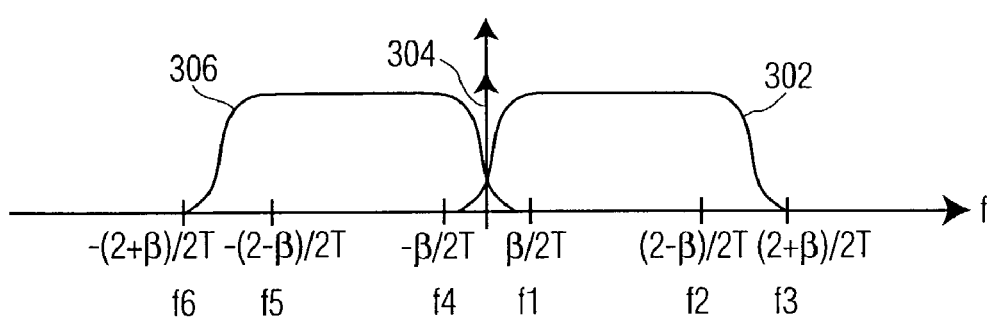

The CTL 204 also operates at the sampling rate of 27 MHz and processes the received sample stream to down convert the signal represented by the sample stream to baseband and to correct for frequency offsets between the transmitter carrier and the receiver tuner LO. To do this, the CTL detects the pilot tone 304/308 and translates the received signal in frequency so that the pilot tone location is maintained at DC. The resulting spectrum is illustrated in FIG. 2b. In FIG. 2b, the pilot tone 304/308 location is illustrated at DC and the translated positive 302 and negative 306 spectral components of the symbol representative signal are illustrated separately. The presence of the pilot tone 304/308 energy at DC produces a DC offset in the signal, which is removed, in a known manner, by a DC removal circuit within the CTL 204.

Figure 2C:
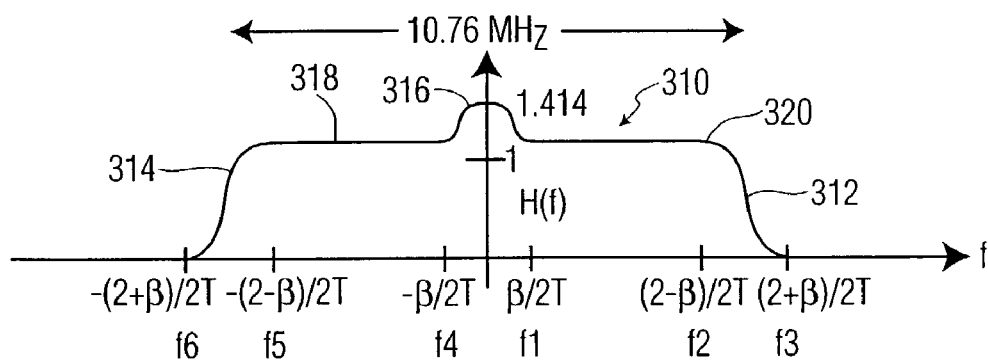

The resulting combined spectrum 310 is illustrated in FIG. 2c and has a baseband bandwidth of around 5.38 MHz. The frequency characteristic of the signal from the CTL 204 is described in equation (1):

$$H(f) = \begin{cases} 1 & \text{for } \frac{\beta}{2T} \le |f| \le \frac{(2-\beta)}{2T} \\ \sqrt{2} * \cos\left(\frac{\pi T |f|}{2\beta}\right) & \text{for } 0 \le |f| \le \frac{\beta}{2T} \\ \cos\left(\frac{\pi T\left[|f| - \frac{(2-\beta)}{2T}\right]}{2\beta}\right) & \text{for } \frac{(2-\beta)}{2T} \le |f| \le \frac{(2+\beta)}{2T} \end{cases} \quad (1)$$

where H(f) is the frequency characteristic of the symbol representative pulse spectral component, f is the frequency in Hertz, β is the roll-off parameter of the transmitted square-root raised cosine pulse, $0 \le \beta \le 1$, and T=1/5.38 MHz=$2*T_S$.

The bottom line of equation (1) describes the outer skirts 312 and 314 of the combined spectrum 310 from frequency locations f2=((2−β)/2T) to f3=((2+β)/2T) and f5=(−(2−β)/2T) to f6=(−(2+β)/2T), respectively. The top line of equation (1) describes the constant portions 318 and 320 of the combined spectrum 310 from frequency locations f1=(β/2T) to f2=((2−β)/2T) and f4=(−β/2T) to f5=(−(2−β)/2T), respectively. One skilled in the art will observe and understand that the outer skirts 312 and 314 and the constant portions 318 and 320 of the combined spectrum 310 conform to the square-root raised cosine characteristic.

However, in the frequency region near DC, i.e. between f4=(−β/2T) and f1=(β/2T), the vestigial sidebands from the positive 302 and negative 306 spectra (of FIG. 2b) overlap. The middle line of equation (1) describes the frequency characteristic 316 of the combined spectrum 310 near DC. This overlap produces a peak in the spectrum 310 between −β/2T and β/2T, equal to √2=1.414 at DC, which is a distortion of the square-root raised cosine characteristic.

Figure 2D:
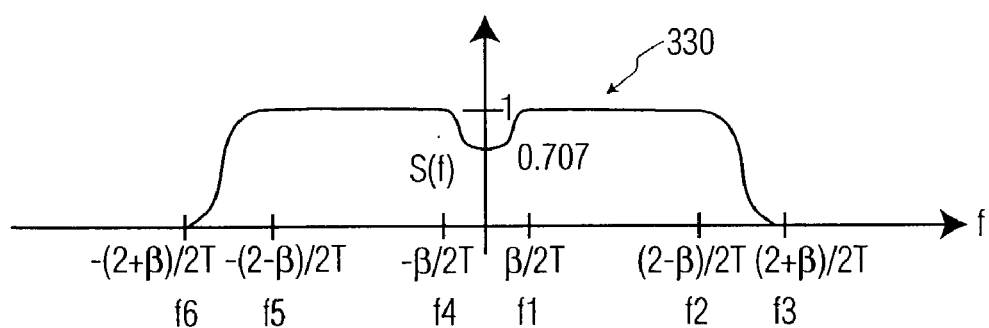

A matched pulse shaping filter 214 which filters the real (in-phase) output of the CTL 204 is implemented as a digital filter exhibiting a square-root raised cosine filtering characteristic modified to compensate for the distortion in the frequency characteristic 310 between −β/2T and β/2T as illustrated in FIG. 2c. The filter characteristic 330 which compensates for this peak is illustrated in FIG. 2d. This filter characteristic exhibits a trough near DC which compensates for the peak near DC in the frequency characteristic of the combined spectrum 310. The mathematical description of the matched pulse shaping filter 214 may be derived from equation (2):

$$S(f)*H(f)=K*RC(f) \quad (2)$$

where S(f) is the required matched filter characteristic, H(f) is the frequency characteristic of the output signal from the CTL 204 as illustrated in FIG. 2c and described in equation (1), K is a constant and RC(f) is the desired known raised cosine frequency characteristic. That is, applying a matched filter having the characteristic S(f) to the signal from the CTL 204 having the characteristic H(f) produces a signal having the desired raised cosine filter characteristic RC(f), scaled by a constant factor K.

From equations (1) and (2), one skilled in the art may derive the following matched filter characteristic:

$$S(f) = \begin{cases} K & \text{for } \frac{\beta}{2T} \leq |f| \leq \frac{(2-\beta)}{2T} \\ \dfrac{K}{\sqrt{2}\cos\left(\dfrac{\pi T|f|}{2\beta}\right)} & \text{for } 0 \leq |f| \leq \dfrac{\beta}{2T} \\ K * \cos\left(\dfrac{\pi T\left[|f|-\dfrac{(2-\beta)}{2T}\right]}{2\beta}\right) & \text{for } \dfrac{(2-\beta)}{2T} \leq |f| \leq \dfrac{(2+\beta)}{2T} \end{cases} \quad (3)$$

where f, β, K and T have the same meanings as for equation (1) and (2), above.

Similarly to equation (1), above, the bottom line of equation (3) describes the skirts of the matched filter 214 characteristic S(f) and the top line of equation (3) describes the constant portion of the matched filter 214 characteristic S(f). As with equation (1), above, these are the same as a standard square-root raised cosine matching filter characteristic. Thus, S(f)*H(f) in these frequency ranges will reproduce the desired raised cosine frequency characteristic RC(f).

The middle portion of equation (3) describes the matched filter 214 characteristic S(f) near DC from frequency f4=(−β/2T) to frequency f1=(β/2T). One skilled in the art will understand that S(f)*H(f) near DC will be a constant K which reproduces the desired raised cosine frequency characteristic RC(f) near DC.

Therefore, the matched filter 214 characteristic S(f), described in equation (3) and illustrated in FIG. 2d, when applied to the symbol representative signal H(f) produced by the CTL 204, described in equation (2) and illustrated in FIG. 2c, i.e. S(f)*H(f), completes the desired raised cosine frequency characteristic RC(f), and also compensates for the linear distortion introduced into the symbol representative signal by the operation of the CTL 204.

One skilled in the art will understand that the constant factor K multiplying all the terms in equations (2) and (3) do not alter the basic pulse shape of interest and solely affect the signal gain. Therefore, the same results still apply.

One example of a fixed point realizable matched filter 214 implementing the frequency response S(f) described by equation (3) and illustrated in FIG. 2d may be designed by calculating a time impulse response s(t) corresponding to the frequency characteristic S(f) and using the impulse response s(t) to derive coefficients for a digital filter, in a known manner. An analytical derivation for the time impulse response s(t) from S(f) is intractable. However, by using numerical methods such an impulse response s(t) may be easily derived.

An inverse fast Fourier transform (IFFT) with appropriate parameters is applied to the frequency response S(f) described by equation (3) and illustrated in FIG. 2d. Any of a number of available mathematical software packages, such as Matlab®, produced by MathWorks, Inc., may be used to derive the impulse response s(t) based on the frequency response S(f) of equation (3). In the illustrated embodiment, an IFFT is calculated on the desired matched filter 214 characteristic S(f) with the number of samples N=8192, and a sample rate of 27 MHz. The resulting IFFT is processed by a Kaiser window with a length $N_K$=151 and a shape parameter α=4 to generate the impulse response s(t).

The resulting impulse response s(t) is truncated to 10 bits resulting in a 105 coefficient representation as displayed in Table 1 (below). In Table 1, the coefficients C0 through C104 are displayed in rows of 10 each, the first row displaying coefficients C0 through C9, the second row displaying coefficients C10 through C19, and so forth. The coefficient C52 is the center coefficient, and the other coefficients are symmetric about the center coefficient C52.

One skilled in the art will understand that other filter examples may be derived which differ in the number of coefficients and in the number of bits per coefficient, depending on a specified level of reliability. The reliability may be measured by how close the filter spectrum resulting from the derived coefficients is to the desired spectrum described in equation (3).

TABLE 1

Matched Filter 214 Coefficients

| | | | | | | | | | |
|---|---|---|---|---|---|---|---|---|---|
| C0 = −1 | 0 | 0 | 0 | −1 | −1 | 0 | 0 | −1 | −2 |
| C10 = −1 | 0 | 0 | −2 | −3 | −2 | 1 | 0 | −3 | −5 |
| C20 = −2 | 2 | 0 | −6 | −7 | −1 | 4 | 0 | −9 | −10 |
| C30 = −1 | 7 | 0 | −14 | −14 | 2 | 12 | 0 | −21 | −20 |
| C40 = 6 | 22 | 0 | −35 | −31 | 18 | 47 | 0 | −80 | −72 |
| C50 = 87 | 306 | 410 | 306 | 87 | −72 | −80 | 0 | 47 | 18 |
| C60 = −31 | −35 | 0 | 22 | 6 | −20 | −21 | 0 | 12 | 2 |
| C70 = −14 | 14 | 0 | 7 | −1 | −10 | −9 | 0 | 4 | −1 |
| C80 = −7 | −6 | 0 | 2 | −2 | −5 | −3 | 0 | 1 | −2 |
| C90 = −3 | −2 | 0 | 0 | −1 | −2 | −1 | 0 | 0 | −1 |
| C100 = −1 | 0 | 0 | 0 | −1 | | | | | |

The matched filter 214 described in detail above provides the matched filtering function required to minimize intersymbol interference (ISI) due to the pulse shape at the output of the carrier tracking loop 204. The remainder of the portion of the HDTV receiver illustrated in FIG. 1 operates in a known manner on the matched filtered signal from the matched filter 214. The symbol timing loop 206 detects the time locations of the transmitted symbols and performs sample rate conversion to the symbol rate. In the illustrated embodiment, the symbol rate is 10.76 MHz. The equalizer 210 analyzes the symbol representative samples and compensates for multipath and other linear distortions introduced into the symbol representative signal by the communications channel and additional filtering. The phase tracking loop 212 adjusts the phase of the equalized symbol representative signal, correcting for phase noise that has not been tracked by the CTL, so that the symbols may be accurately detected and processed by the receiver back end. The synchronization detector 208 analyzes the symbol representative signal to detect the frames and the segments within the frames to provide overall time synchronization for the HDTV receiver, all in a known manner.

The HDTV receiver arrangement described above locates the matched pulse shaping filter 214 after the carrier tracking loop 204 and before the symbol timing loop 206. The matched filter 214 may be located at other locations, as described above. However, due to additional problems associated with other locations, this is the preferred location. Particularly, if placed in any location after the carrier tracking loop 204, the frequency response characteristic illustrated in equation (3) may be implemented in the matched filter to compensate for the signal distortion present at the output of the CTL 204. In addition, further known linear distortions introduced by other circuit elements may also be compensated for in the matched filter 214.

One skilled in the art will understand that the particular matched filter design described by equation (3) applies to other digital communications systems besides ATSC-HDTV, which support root-raised cosine pulse shaping and VSB modulation. For these systems, the unmatched CTL output satisfies equation (1). In particular, this design is of interest in systems for which the possible frequency offsets present in the system are in the order of magnitude of the pulse excess bandwidth. For these systems, placement of a matched filter prior to the CTL requires frequency offset information fed back to the tuner from the CTL in order to avoid severe distortions in the matched filter output.

What is claimed is:

1. A high definition television receiver in accordance with the ATSC standard, for receiving a television signal, comprising:

a receiver front end, generating a pulse signal which has riot been filtered by a matched pulse shaping filter;

a carrier tracking loop, coupled to the receiver front end, for translating the pulse signal to baseband and introducing additional linear distortion into the baseband pulse signal;

a matched pulse shaping filter, coupled to the carrier tracking loop, for generating a fully matched filtered pulse signal compensated for the distortion intrinsic to the shape of the signal pulse from the receiver front end and the distortion introduced by the carrier tracking loop; and a receiver back end, coupled to the matched filter, for producing an image represented by a video component of the television signal and a sound represented by an audio component of the television signal.

2. The receiver of claim 1 wherein:

the pulse signal from the receiver front end is a near baseband signal having positive and negative frequency spectral images, each having a limited bandwidth and exhibiting a skirt on the low frequency band edge; and the carrier tracking loop translates the positive and negative frequency spectral images to baseband such that the skirts overlap near DC, producing the additional distortion near DC and no additional distortion elsewhere.

3. The receiver of claim 2 wherein:

the pulse signal from the receiver front end exhibits a square-root raised cosine frequency characteristic;

the baseband pulse signal exhibits a distorted square-root raised cosine frequency characteristic near DC and a square-root raised cosine frequency characteristic elsewhere; and the matched filter exhibits a modified square-root raised cosine response characteristic near DC, modified to compensate for the distortion near DC, and a square-root raised cosine response characteristic elsewhere.

4. The receiver of claim 2 wherein:

the additional distortion near DC is a peak; and the matched filter exhibits a corresponding trough near DC.

5. The receiver of claim 2 wherein:

the signal from the receiver front end further includes a pilot tone having respective positive and negative frequency images located at frequencies within the low frequency skirts of the positive and negative frequency spectral images of the near baseband signal; and the carrier tracking loop translates the positive and negative frequency spectral images such that the positive and negative pilot tone images are translated to DC.

6. The receiver of claim 3 where the matched pulse shaping filter frequency response S(f) is of the type:

$$S(f) = \begin{cases} K & \text{for } \frac{\beta}{2T} \leq |f| \leq \frac{(2-\beta)}{2T} \\ \dfrac{K}{\sqrt{2}\cos\left(\frac{\pi T|f|}{2\beta}\right)} & \text{for } 0 \leq |f| \leq \frac{\beta}{2T} \\ K*\cos\left(\dfrac{\pi T\left[|f| - \frac{(2-\beta)}{2T}\right]}{2\beta}\right) & \text{for } \frac{(2-\beta)}{2T} \leq |f| \leq \frac{(2+\beta)}{2T} \end{cases}$$

where f is the frequency in Hertz, $\beta$ is the roll-off parameter $0 \leq \beta \leq 1$, K is a constant, T=1/B and B is the passband bandwidth of the received signal in Hz.

* * * * *